Aug. 4, 1936.  T. C. HEUER  2,050,006
ARCH SUPPORTER
Filed July 13, 1934
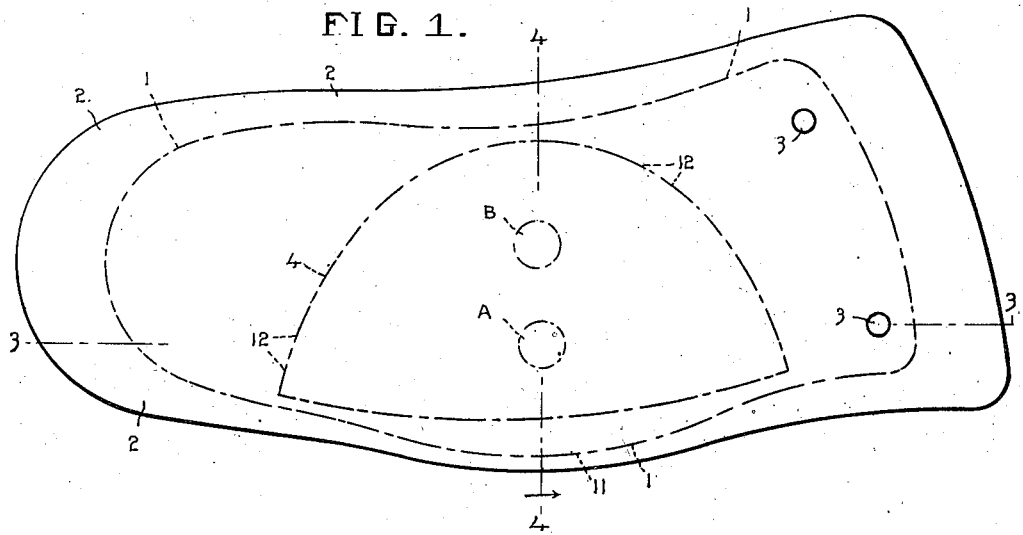
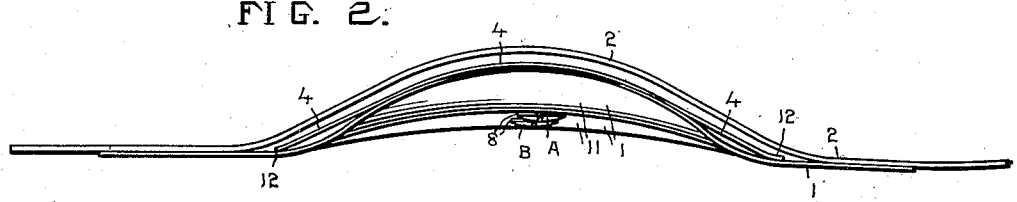
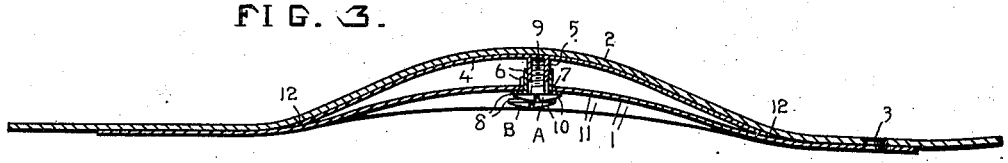
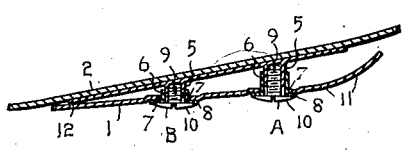
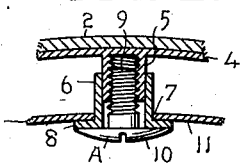
Inventor
T. C. Heuer
By
Attorney

UNITED STATES PATENT OFFICE 2,050,006

ARCH SUPPORTER

Tatum C. Heuer, Harrison, Ark.

Application July 13, 1934, Serial No. 735,025

1 Claim. (Cl. 36—71)

My invention consists in a new and useful improvement in arch supporters and is designed to provide a simple and efficient flexible support for weak, fallen or defective arches of feet. The particularly novel and useful feature of my invention is the use of a form fitting rigid, arched base-support which is made in a suitable size according to the size of the shoe with which it is to be used, upon which is placed a convex spring disc made of steel or other strong and flexible material, the lower edge of which rests upon the base-support and is movable upon the surface thereof, since this disc has a greater curvature than that of the base-support upon which it rests, so that the disc contacts the surface of the base-support only at the edge of the disc. The base-support and disc each have two registering holes for the insertion of adjustable fastening members to position the disc in proper place. These adjustable members permit the disc to have a springy up-and-down movement, as it rests upon the base-support, and yet hold the disc against displacement. On top of the base-support and disc, after they have been joined by the adjustable members, there is placed a leather tread of suitable size and shape to fit the particular shoe, which rests upon the base-support at its ends, and the disc at its middle, and has one of its ends attached to the adjacent end of the base-support.

While I have illustrated in the drawing filed herewith and have hereinafter fully described one specific embodiment of my invention, it is to be distinctly understood that I do not consider my invention limited to said specific embodiment, but refer for its scope to the claims appended hereto.

In the drawing:

Fig. 1 is a top plan view of my device.

Fig. 2 is a side elevation.

Fig. 3 is a longitudinal vertical section on line 3—3 of Fig. 1.

Fig. 4 is a transverse vertical section on line 4—4 of Fig. 1.

Fig. 5 is an enlarged detail of one of the fastening members of Fig. 3.

As illustrated in the drawing, my device comprises the lower arched base-support 1 of any suitable rigid material, such as metal, and the upper tread 2 of any suitable flexible material, such as leather. The upper tread 2 is fixed at one end to one end of the base-support 1 by rivets 3. Interposed between these elements 1 and 2 is the resilient convex disc 4 adjustably mounted on the base-support 1 by means of the two fastening members A and B. Each of these members A and B consists of an interiorly threaded tubular element 5 depending from the underside of the disc 4, about which is slidably disposed the sleeve 6 passed loosely through a hole 7 in the base-support 1, and having an annular flange 8 on its lower end engaging the base-support 1, and a bolt 9 threaded into the tubular element 5 and having the head 10 engaging the flange 8.

As indicated in Fig. 3, the base-support 1 has the arched portion 11 over which is disposed the resilient disc 4 having a greater curvature than the arched portion 11 so that only the edge 12 of the disc 4 rests upon the base-support 1.

It is obvious that adjustment of the bolts 9 relative to the elements 5 will adjust the disc 4 relative to the base-support 1, and that when weight is imposed upon the device as in standing or walking, the disc 4 will be depressed relative to the base-support 1, the sleeves 6 passing through the holes 7. Thus it will be seen that I have provided a mechanism whereby the proper degree of tension, on the disc 4, will provide exactly the correct amount of support by my device, for the peculiar demands of the arch of the foot of the wearer.

Having described my invention, what I claim is:

In an arch supporter, the combination of a plate having an orifice; a convex resilient disc resting on said plate, and having a depending internally threaded lug; a sleeve passed loosely through said orifice, slidably surrounding said lug and having an annular flange bearing against the underside of said plate; and a bolt threaded into said lug and having a head bearing against said flange.

TATUM C. HEUER.